(12) United States Patent
Jin et al.

(10) Patent No.: US 7,965,352 B2
(45) Date of Patent: Jun. 21, 2011

(54) LIQUID CRYSTAL DISPLAY DEVICE TO CONTROL VIEWING ANGLE

(75) Inventors: Hyun Suk Jin, Gunpo-si (KR); Sun Hwa Lee, Gunpo-si (KR); Hyun Seok Jang, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/815,998

(22) Filed: Jun. 15, 2010

(65) Prior Publication Data
US 2011/0059670 A1    Mar. 10, 2011

Related U.S. Application Data

(62) Division of application No. 11/476,256, filed on Jun. 27, 2006, now Pat. No. 7,760,292.

(30) Foreign Application Priority Data

Oct. 13, 2005   (KR) ........................ 10-2005-0096596

(51) Int. Cl.
*G02F 1/1347* (2006.01)
*G02F 1/1337* (2006.01)
(52) U.S. Cl. .......... 349/75; 349/102; 349/123; 349/130; 349/132; 438/30

(58) Field of Classification Search .................. None
See application file for complete search history.

(56) References Cited

U.S. PATENT DOCUMENTS

| | | | |
|---|---|---|---|
| 5,570,211 A | 10/1996 | Hanaoka et al. | |
| 6,028,656 A | 2/2000 | Buhrer et al. | |
| 2005/0190329 A1 | 9/2005 | Okumura | |
| 2005/0243265 A1 | 11/2005 | Winlow et al. | |
| 2007/0085957 A1 | 4/2007 | Jin et al. | |
| 2008/0094545 A1 | 4/2008 | Ko | |
| 2008/0094546 A1 | 4/2008 | Li et al. | |
| 2008/0143930 A1* | 6/2008 | Jin et al. | 349/96 |
| 2008/0158484 A1 | 7/2008 | Jung | |

* cited by examiner

*Primary Examiner* — Hemang Sanghavi
(74) *Attorney, Agent, or Firm* — Brinks Hofer Gilson & Lione

(57) ABSTRACT

A view angle controlling LCD comprises a first panel part that has a first group of electrodes and a first liquid crystal layer driven by a first vertical electric field. The first group of electrodes includes a pixel electrode and a common electrode to generate the first vertical electric field. The view angle controlling LCD device further comprises a second panel part deposited on the first panel part that has a second group of electrodes and a second liquid crystal layer panel driven to have slope angle from the horizontal alignment condition by a second vertical electric field. The second group of electrodes includes a first electrode and a second electrode to generate the second vertical electric field.

14 Claims, 20 Drawing Sheets

[WIDE VIEW ANGLE MODE]

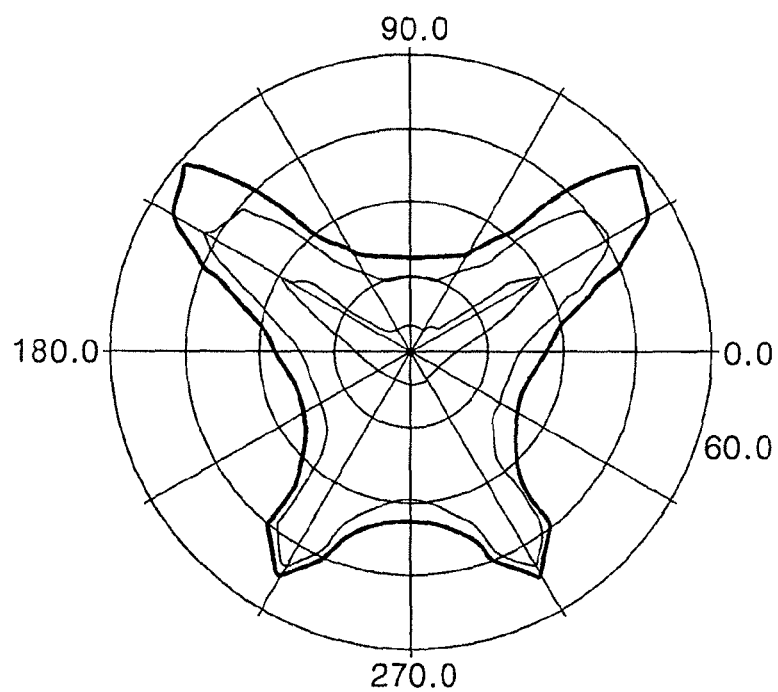

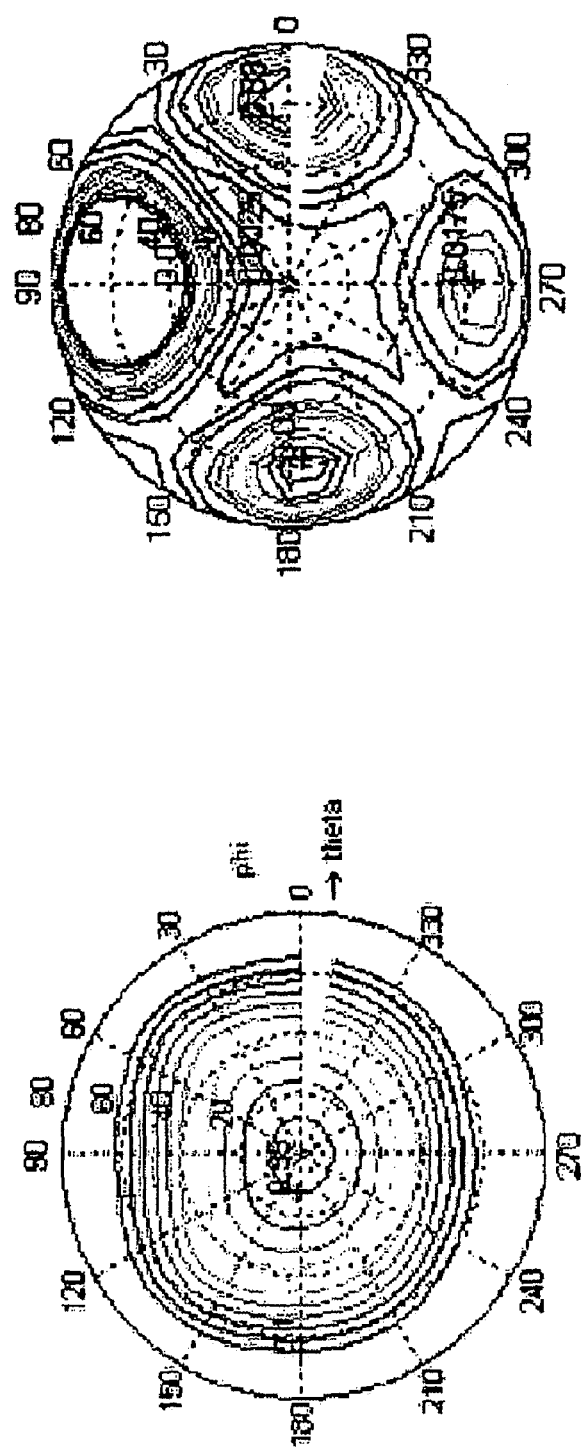

[CONTRAST RATIO AT WIDE VIEW ANGLE MODE]

[CONTRAST RATIO AT NARROW VIEW ANGLE MODE]

LIQUID CRYSTAL DISPLAY DEVICE TO CONTROL VIEWING ANGLE

The present patent document is a divisional of U.S. patent application Ser. No. 11/476,256, filed Jun. 27, 2006, which claims priority to Korean Patent Application No. P2005-0096596 filed in Korea on Oct. 13, 2005, which is hereby incorporated by reference.

BACKGROUND

1. Field of the Invention

The present invention relates to liquid crystal display devices. More particularly, the present invention relates to controlling a view angle which can be selectively driven between a wide view angle mode and a narrow view angle mode.

2. Discussion of the Related Art

Liquid crystal display (LCD) device controls electric field applied to liquid crystal cells. Thus LCD device displays pictures as incident light on a liquid crystal cell is changed by the electric field. LCD element is differentiated between a vertical electric field type and a horizontal electric field type according to an electric field direction which drives the liquid crystal.

In the vertical electric field type, a pixel electrode and a common electrode are formed on an upper substrate and a lower substrate which face each other vertically. The common electrode and pixel electrode are also formed to face each other in vertical direction thereon. The vertical electric field type applies electric field in vertical direction to a liquid crystal cell with a voltage applied to the electrodes. Twisted Nematic Mode (TN mode) is the most widely used LCD which is driven by the vertical electric field type.

In general, the development of the LCD focuses on improving an aperture ratio and ensuring a wide view angle. However, for works requiring security like using computers for personal purposes and doing bank related works, LCD with narrow view angle is needed. Therefore, it is an important task to develop a view angle controlling LCD in which the switching between the wide view angle mode and narrow view angle mode can be done easily.

In TN mode, currently the most widely used type, there are two ways of controlling the view angle: one way of using a viewing angle characteristic and the other way of using voltage-transmittance ratio characteristic according to the viewing angle.

FIGS. 1a to 1c illustrate the view angle controlling LCD using the voltage-transmittance ratio characteristic in TN mode.

Referring to FIG. 1, general voltage-transmittance ratio characteristic of the TN mode shows different curve according to the view angle. The curve shows that the voltage and transmittance are in inverse proportion when the driving voltage is within the boundary of 1V-2V to the view angle. However, the curve shows different voltage-transmittance ratio characteristic according to the view angle beyond the voltage boundary. In other words, when the driving voltage is more than 2V, the curve shows two different features. When the view angle is around 0°, certain transmittance ratio is maintained according to voltage increase. However, if the viewing angle is out of 0° range and increases, the transmittance ratio is increased according to the voltage increase. Using this voltage-transmittance ratio characteristic of the TN mode, the wide view angle mode and narrow view angle mode are selectively operated. The view angle controlling method of the TN mode using the voltage-transmittance ratio characteristic is to control the view angle by changing a driving circuit of the LCD so that the two driving voltage range is selectively output.

To operate the wide viewing angle mode, use the driving voltage range 'A' (about 1V~2.6V). If the TN mode LCD is operated at the 'A' voltage range, decrease in the contrast ratio is small even though the view angle increases. Thus, left and right view angle and lower part view angle are wide as illustrated in FIG. 1B.

To operate the narrow viewing angle mode, use the driving voltage range 'B' (about 1V~4.6V). If the TN mode LCD is operated at the 'B' voltage range, there is hardly a change in the contrast ratio when the viewing angle is 0° whereas decrease in the contrast ratio gets bigger according to increase in the view angle. Thus, left and right view angle and lower part view angle are narrow as illustrated in FIG. 1C.

In order to drive the view angle controlling LCD illustrated in FIG. 1A or FIG. 1C, it is necessary to output the liquid crystal operating voltage in two values at a DC/DC converter and input the two values to gamma power part and operate the LCD. However, the view angle controlling principle which has to design the voltage range differently has a very little effect as illustrated in FIGS. 1B and 1C.

BRIEF SUMMARY

A view angle controlling LCD device comprises a first panel part that has a first group of electrodes and a first liquid crystal layer driven by a first vertical electric field. The first group of electrodes includes a pixel electrode and a common electrode to generate the first vertical electric field. The view angle controlling LCD device further comprises a second panel part deposited on the first panel part that has a second group of electrodes and a second liquid crystal layer panel driven to have slope angle from the horizontal alignment condition by a second vertical electric field. The second group of electrodes includes a first electrode and a second electrode to generate the second vertical electric field.

BRIEF DESCRIPTION OF THE DRAWINGS

The file of the parent application of this patent contains at least 9 drawings executed in color. Copies of this patent with color drawing(s) will be provided to the Patent and Trademark Office upon request and payment of the necessary fee.

FIGS. 1A to 1C illustrate the view angle controlling LCD in related art which controls the view angle using the voltage-transmittance ratio characteristic at TN mode.

FIGS. 10A and 10B illustrate view angle-brightness characteristic of the view angle controlling LCD according to the present invention.

DETAILED DESCRIPTION OF THE DRAWINGS AND THE PRESENTLY PREFERRED EMBODIMENTS

Purposes and advantages of the present invention other than those mentioned earlier will be described in detail through the embodiments of the present invention referring to Figures attached.

Referring to FIGS. 2 to 11, detailed description of the embodiment of the present invention will be given hereinafter.

Figure 1A:
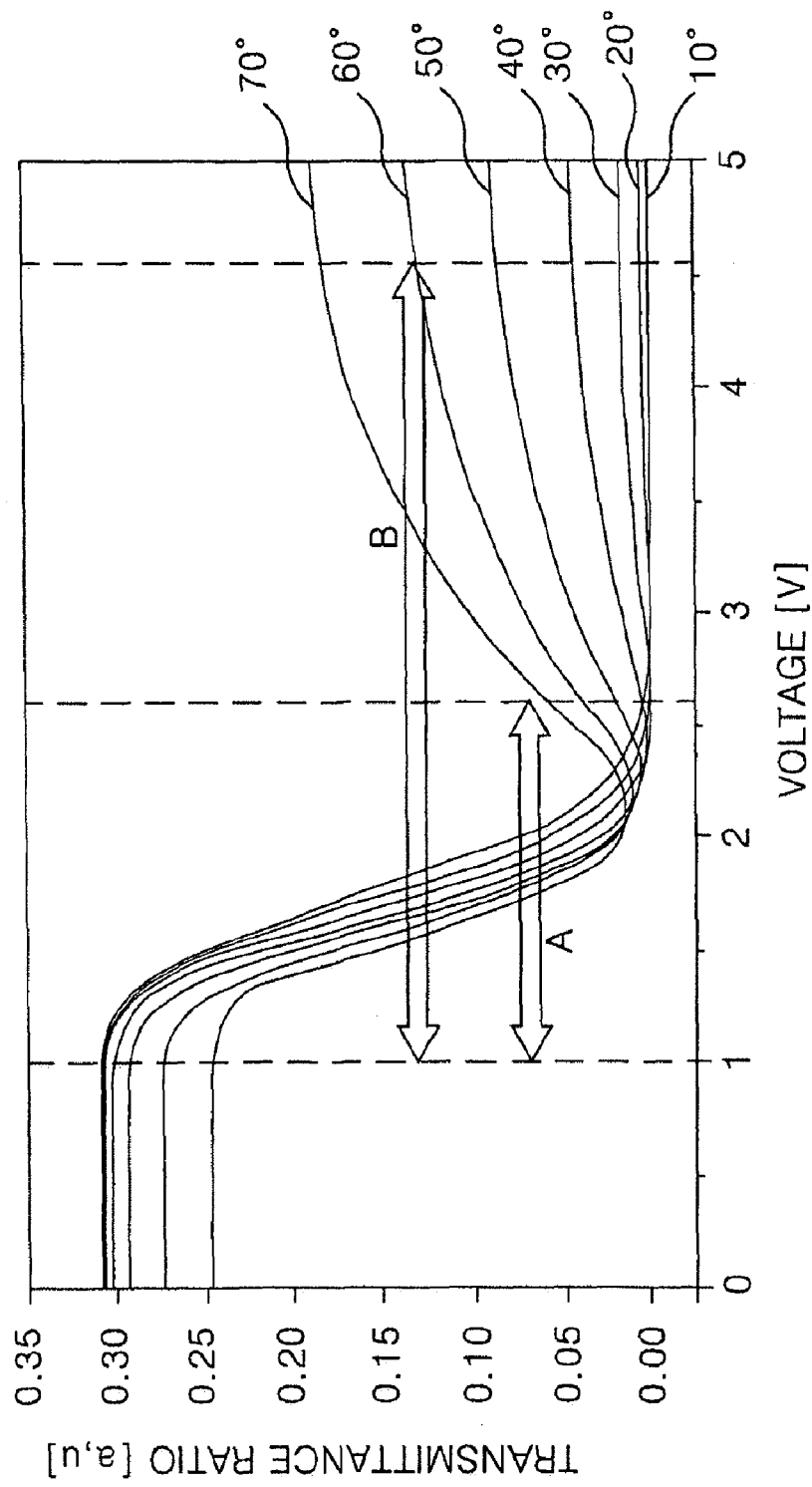
Figure 1B:
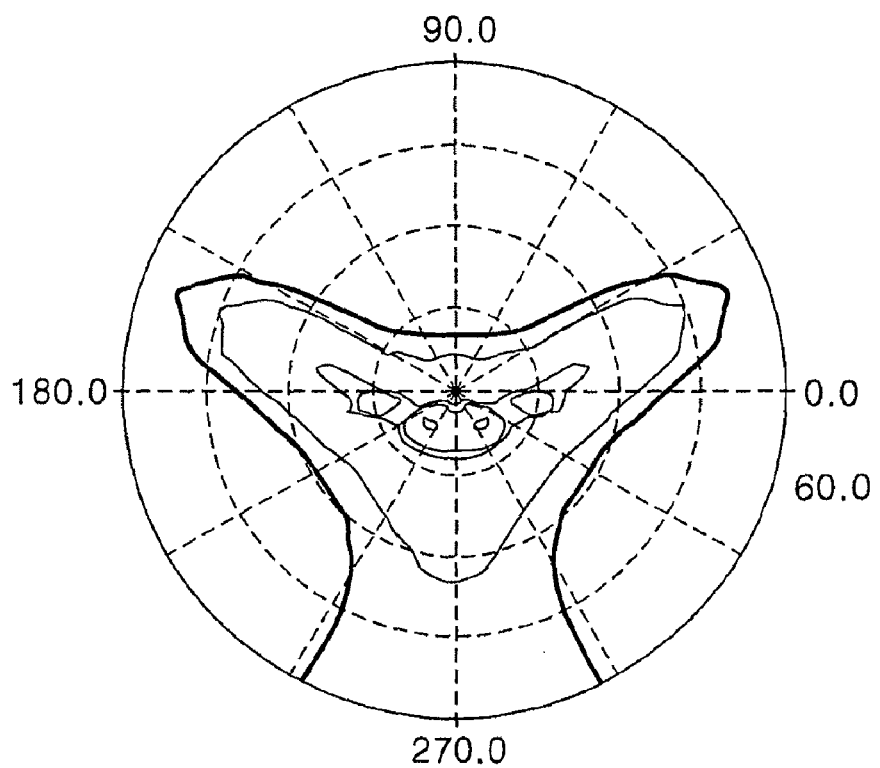
Figure 2:
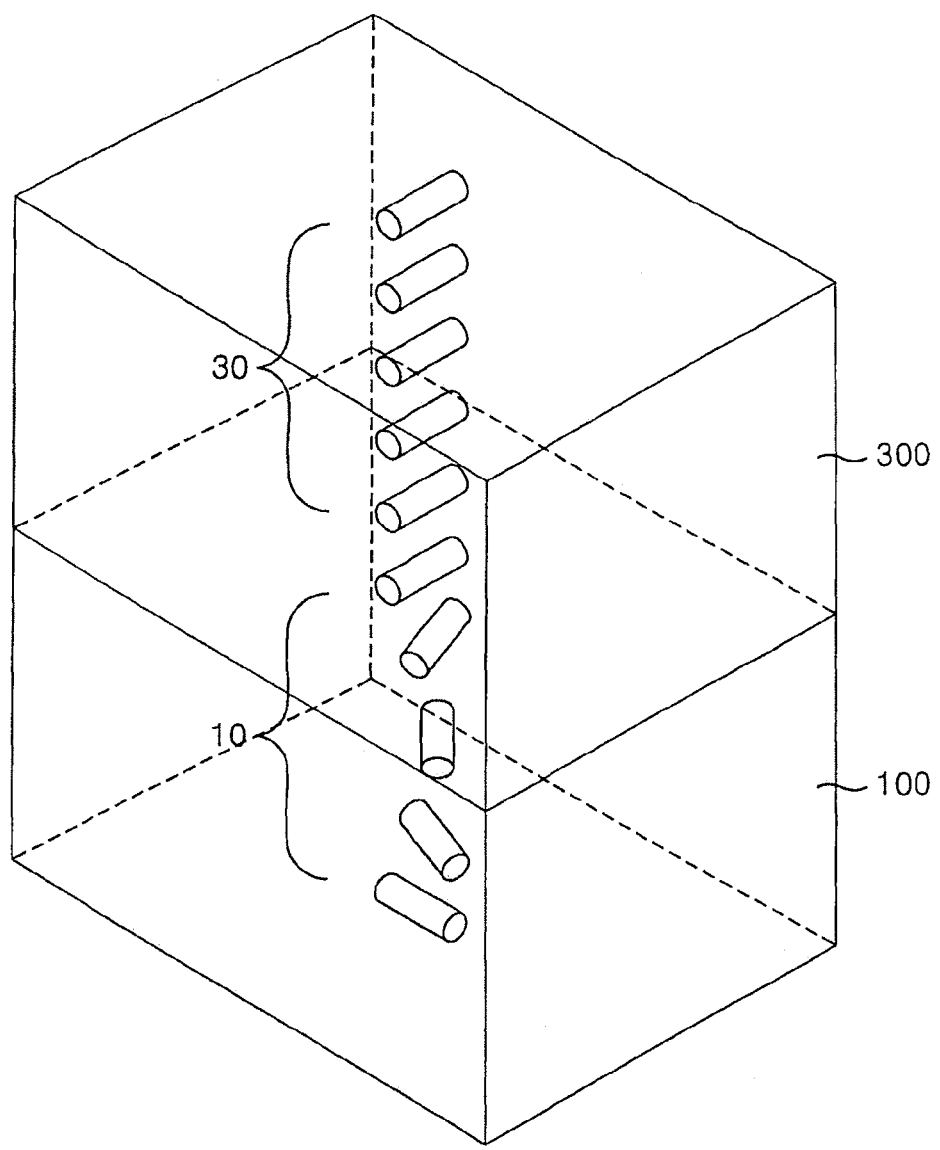
FIG. 2 illustrates the view angle controlling LCD according to the present invention.

Referring to FIG. 2, the view angle controlling LCD according to the present invention comprises the first panel part 100 which drives the first liquid crystal 10 of a Twisted Nematic mode (TN mode) and the second panel part 300 which drives the second liquid crystal 30 of an Electrical Controlled Birefringence mode (ECB mode).

The first panel part 100 displays white or black image on a screen.

The second panel part 300 controls the view angle by switching freely between a wide view angle and a narrow view angle according to the application of voltage. The second panel part 300 is allocated on the upper or lower part of the first part 100 and controls the viewing angle.

Figure 3A:
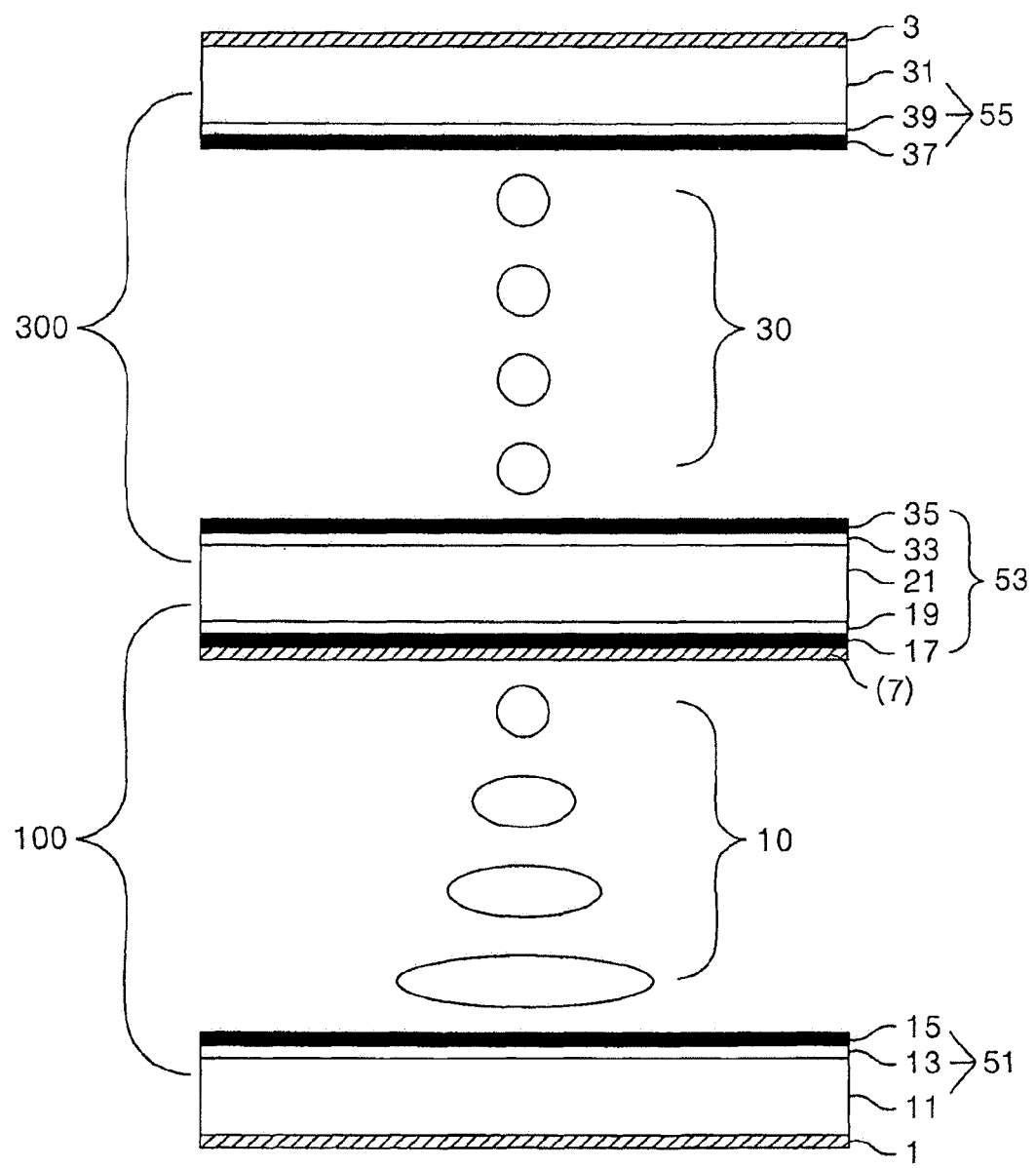
FIGS. 3A and 3B illustrate the view angle controlling LCD shown in the FIG. 2 in detail.
Figure 3B:
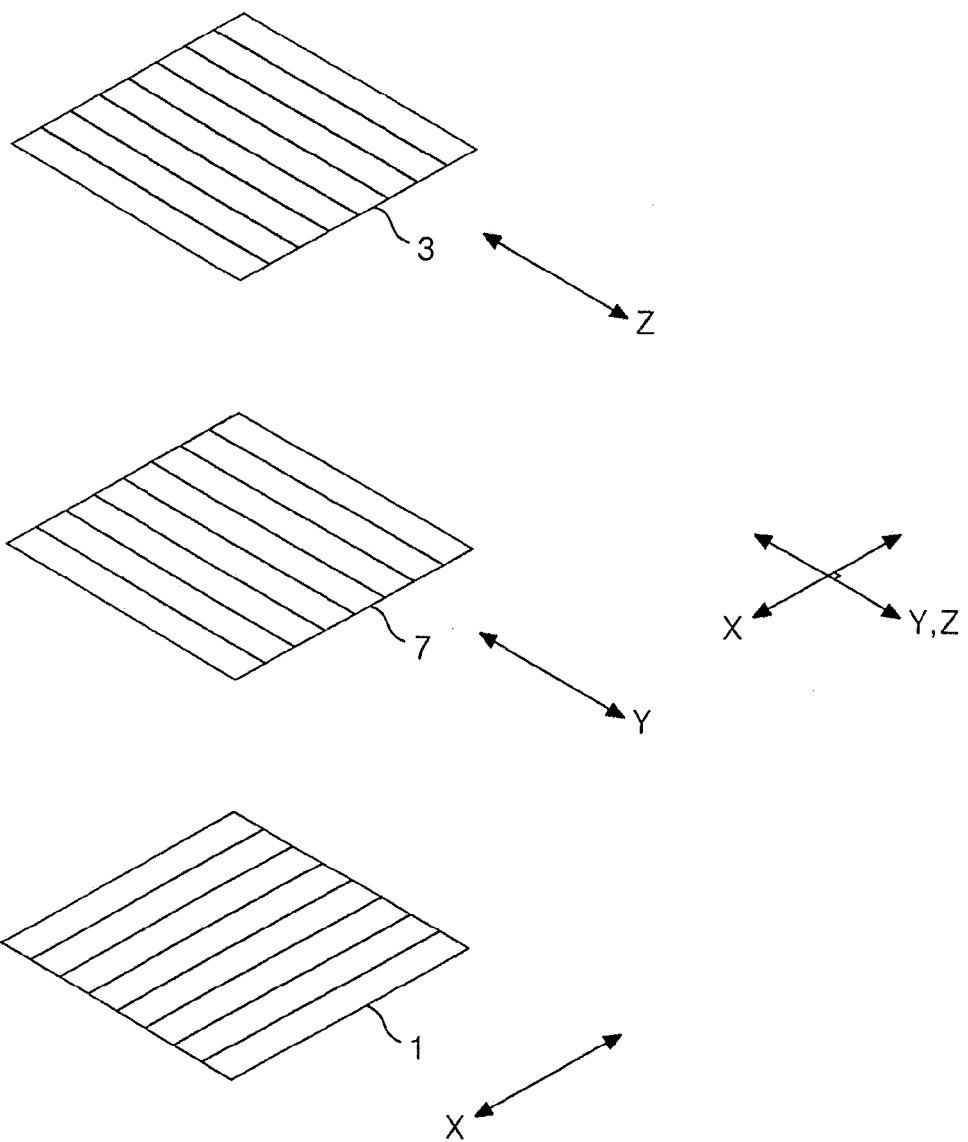

The first panel part 100 and the second panel part 300 are described in detail referring to FIGS. 3A and 3B. A part of a unit pixel area is illustrated in FIGS. 3A and 3B.

The first panel part 100 driven by TN mode includes the first array substrate 51 and the second array substrate 53 which is bonded to face each other, a spacer which maintains a certain cell gap between the first array substrate 51 and the second array substrate 53, and a first liquid crystal layer 10 filled in the cell gap.

The first array substrate 51 includes the first substrate 11, a gate line and a data line which are formed on the upper part of the first substrate 11 and which define a unit pixel, a thin film transistor formed at a crossing area of the gate line and the data line, a pixel electrode 13, and the first alignment layer 15 coated on the pixel electrode to align the first liquid crystal layer 10.

The second array substrate 53 includes a common electrode 19 formed on the lower part of the second substrate 21 and form an electric field with the pixel electrode 13 and the second alignment layer 17 coated on the common electrode 19 to align the first liquid crystal layer 10.

The thin film transistor responds to a scan signal supplied to the gate line so that a pixel signal supplied to the data line is fully charged to the pixel electrode 13 and is maintained.

The pixel electrode 13 makes an electric potential difference with the common electrode 19 by the charge pixel signal. Due to this electric potential difference, the first liquid crystal layer 10 located between the first array substrate 51 and the second array substrate 53 is driven by dielectric anisotropy. The light incident from a light source (not shown) passes through the pixel electrode 13 and advances towards the second array substrate 53.

The first alignment layer 15 defines the initial alignment condition of the first liquid crystal layer 10 close to the first array substrate 51 according to the rubbing direction of the alignment layer.

The second alignment layer 17 defines the initial alignment condition of the first liquid crystal layer 10 close to the second array substrate 53 according to the rubbing direction of the alignment layer.

The rubbing direction of the first alignment layer 15 and the second alignment layer 17 is formed to cross each other. Thus the long axis array direction of the first liquid crystal molecules 10 is twisted in 90° sequentially between the first array substrate 51 and the second array substrate 53.

A lower polarizer 1 which selectively transmits the incident light from the light source which is not illustrated is formed on the lower part of the first array substrate 51.

A middle polarizer 7 can be formed on the upper or lower part of the second array substrate 53.

Detailed description of the polarizer will be given at the detailed description of FIG. 3B.

The second panel part 300 driven in the ECB mode includes a spacer which maintains the certain cell gap between the second array substrate 53 and the third array substrate 55 bonded to face each other and the second liquid crystal layer 30 filled in the cell gap.

The second array substrate 53 includes a second substrate 21, the first electrode 33 formed on the upper part of the second substrate 21 and a third alignment layer 35 coated on the first electrode 33 to align the second liquid crystal layer 30.

The third array substrate 55 includes a third substrate 31, the second electrode 39 which is formed on the lower part of the third substrate 31 forming an electric field with the first electrode 33, and the fourth alignment layer 37 coated on the second electrode 39 to align the second liquid crystal layer 30.

A voltage is applied to the first electrode 33 and the second electrode 39 and an electric potential difference is formed in vertical direction. Due to the electrical potential difference, the second liquid crystal layer 30 which is located between the second array substrate 53 and the third array substrate 55 is driven by the dielectric anisotropy. The light incident through the first panel part 100 from a light source (not shown) passes towards the third array substrate 55.

The third alignment layer 35 and the fourth alignment layer 37 define the initial alignment condition of the second liquid crystal layer 30 according to the rubbing direction of the alignment layer.

An upper polarizer 3 which selectively transmits the incident light from the second liquid crystal layer 30 is formed on the upper part of the third array substrate 55.

A color filter for displaying color image and a black matrix for preventing light leakage can be further formed between the lower part of the third array substrate 55 and the second electrode 39.

The pixel electrode 13, the common electrode 19, the first electrode 33 and the second electrode 39 are formed as a transparent electrode.

Referring to FIG. 3B, polarization direction of the polarizer will be described in detail.

A transmitting axis Z of the upper polarizer 3 is vertical to a transmitting axis X of the lower polarizer 1. A transmitting axis Y of a middle polarizer 7 which can be further formed is in one body with the transmitting axis Z of the upper polarizer 3. A wide view angle compensation film is adhered to the upper polarizer 1 and middle polarizer 7 and compensates the view angle of the first panel part 100 driven by TN mode. If the middle polarizer 7 is not formed further, the wide view angle compensation film is located at the area where the middle polarizer 7 should be formed. Each polarizer 1, 3, 7 selectively transmits the linearly polarized light which is parallel to the transmitting axis.

The view angle controlling LCD of the present invention displays black and white by the voltage applied to the first panel part and drives the wide view angle and the narrow view angle by the voltage applied to the second panel part.

The first panel part 100, in other words, black and white image displaying method of the TN mode will be described referring to FIGS. 4A and 4B.

The upper polarizer 3 is adhered to the light radiated side of the third array substrate 55. Optionally, the middle polarizer 7 can be further adhered to the light incident side of the third array substrate 55. The lower polarizer 1 which has the polarizing axis vertical to the polarizing axis of the upper polarizer 3 is adhered to the light incident side of the first array substrate 51. The TN mode 100 includes an alignment layer to set the initial tilt angle of the liquid crystal and the transparent electrode at the lower part of the first array substrate 51 and the second array substrate 53. The operation of the TN mode first panel part 100 under Normally White mode is described hereinafter.

Figure 4A:
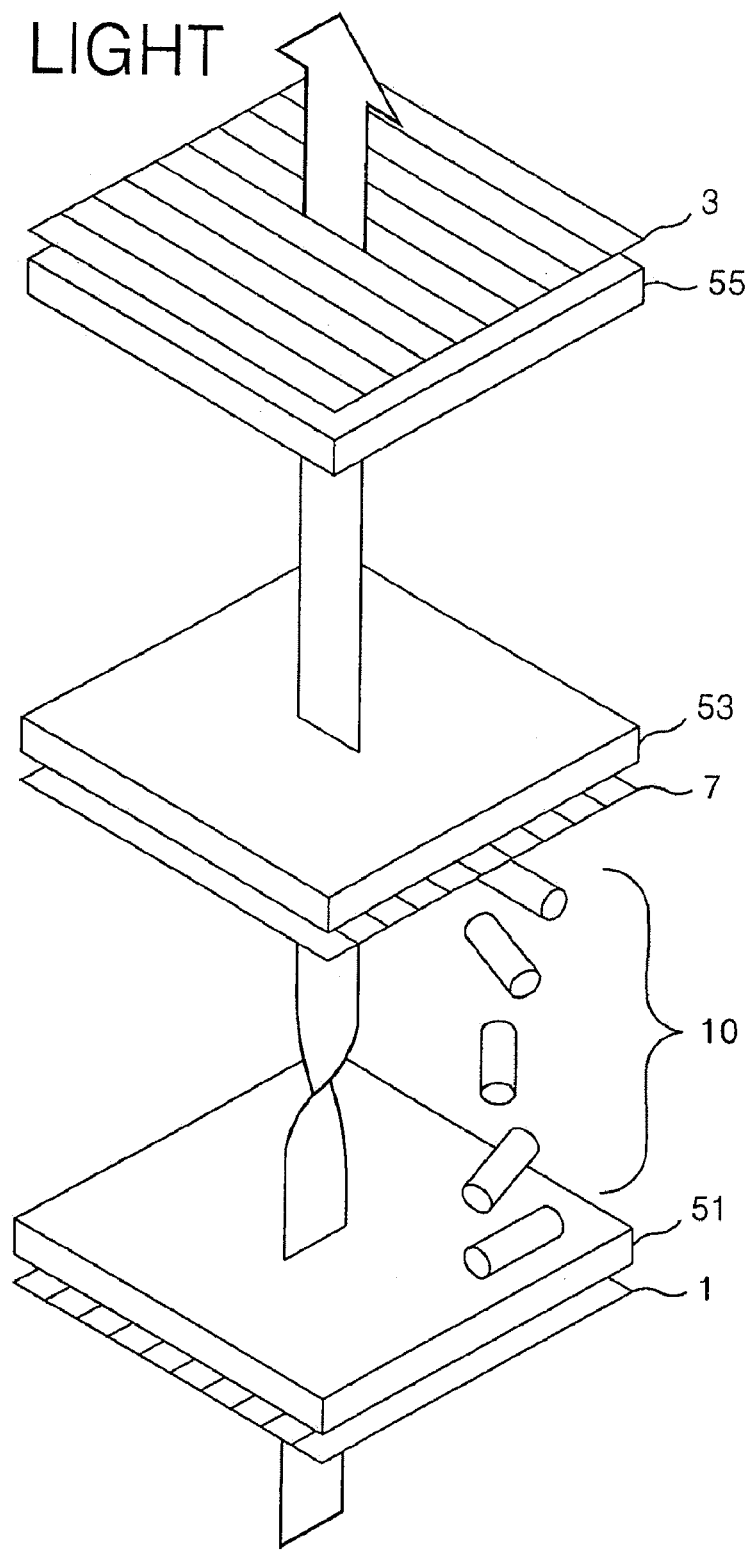
FIGS. 4A and 4B illustrate the operation of the first panel part of the view angle controlling LCD according to the present invention.
Figure 4B:
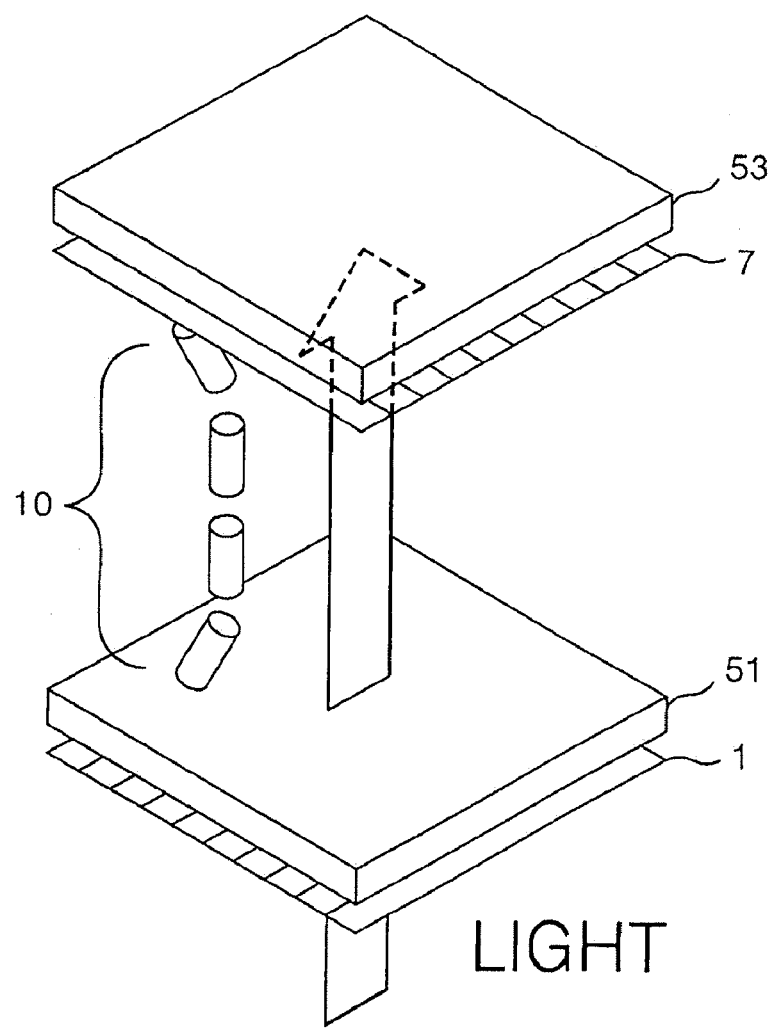

Referring to FIG. 4A, if the voltage is not applied to the transparent electrode of the first array substrate 51 and to the transparent electrode of the lower part of the second array substrate 53 (inactivated condition), it is maintained that the long axis direction of the first liquid crystal molecules 10 is twisted 90° sequentially between the first array substrate 51 and the second array substrate 53. Under the inactivated condition, the incident light is polarized as it transmits the lower polarizer 1. The polarization direction of the polarization condition changes 90° as it passes the first liquid crystal layer 10 which has the twisted structure. Thus the incident light is identical to the polarization characteristic of the upper polarizer 3 or the middle polarizer 7 and the upper polarizer 3 so that white image can be displayed. On the contrary, referring to FIG. 4B, if the voltage is applied to the transparent electrode of the lower part of the second array substrate 53 and the transparent electrode of the first array substrate 51 (activated condition) at the TN mode first panel part 100, the long axis of the liquid crystal distributed in the middle of the first liquid crystal layer 10 rises vertically to be parallel to the electric field due to the voltage difference. Thus, the first liquid crystal layer 10 is arranged vertically as twisted structure becomes disappeared. Under the activated condition, the incident light is polarized as it passes through the lower polarizer 1. The polarization characteristic of the light is maintained. Therefore, the light is blocked and the screen displays black image as the polarized light does not parallel with the polarization direction of the upper polarizer 3 or the middle polarizer 7 and the upper polarizer 3.

The second panel part 300, in other words, the wide view angle mode and narrow view angle mode driving method of the ECB mode will be described referring to FIGS. 5A and 5B.

The second liquid crystal layer 30 of the ECB mode 300 which controls the view angle is aligned so that the long axis of the second liquid crystal molecule 30 and polarized incident light axis of the second array substrate 53 make 0° or 90°. As the long axis of the second liquid crystal molecule 30 and polarized incident light axis of the second array substrate 53 are aligned to be 0° or 90°, the phase delay in left and right sides when operating the narrow view angle mode is maximized. Thus effective narrow view angle mode operation is possible. Detailed description of driving the narrow view angle mode will be described with reference to FIG. 5B in the following.

Figure 5A:
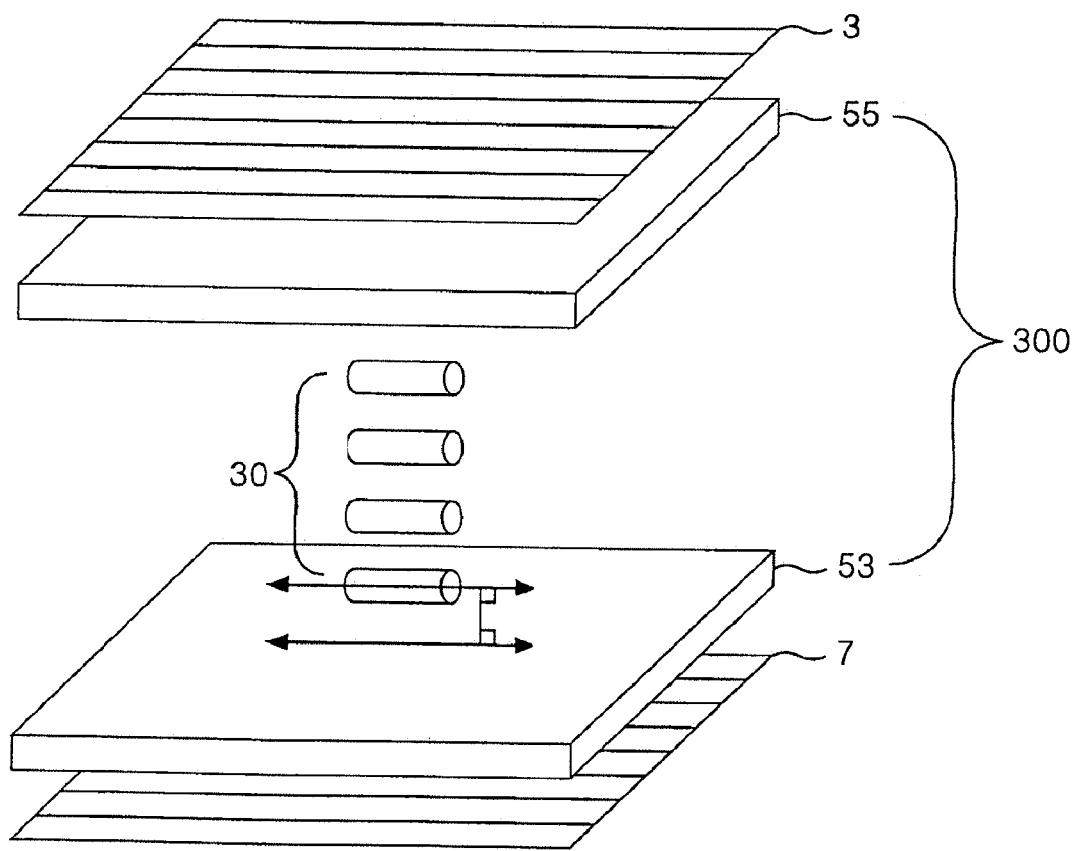
FIGS. 5A and 5B illustrate the operation of the second panel part of the view angle controlling LCD according to the present invention.

Referring to FIG. 5A, if the voltage is not applied to the transparent electrode of the upper part of the second array substrate 53 and to the transparent electrode of the third array substrate 55 (inactivated condition), the long axis of the second liquid crystal molecules 30 is arranged in parallel between the second array substrate 53 and the third array substrate 55. Under the inactivated condition, the incident light which came through the second panel part 200 passes the second liquid crystal layer 30 without phase delay as the long axis of the second liquid crystal molecules 30 is arranged in parallel between the second array substrate 53 and the third array substrate 55 and as the liquid crystal is not twisted. The light which passed the second liquid crystal layer 30 maintains the polarization characteristic of the polarized incident light which passed the middle polarizer 7 or the first liquid crystal layer. Thus normal wide view angle mode is operated.

Figure 5B:
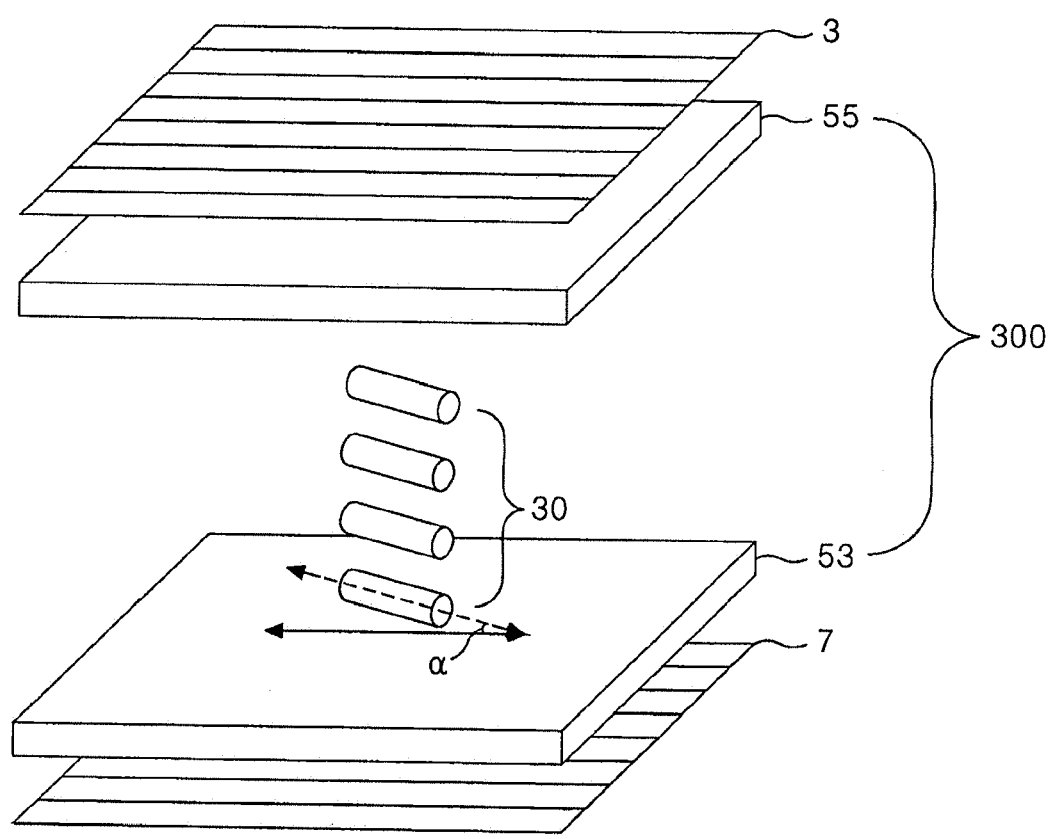

On the contrary, referring to FIG. 5B, if the voltage is applied to the transparent electrode of the upper part of the second array substrate 53 and to the transparent electrode of the third array substrate 53 (activated condition), the long axis of the second liquid crystal layer 30 slopes with a certain angle (α) to the second array substrate 53 on condition that it is parallel and plane due to the voltage difference. Under the activated condition, the incident light from the second panel part 300 passes the sloped second liquid crystal layer 30. The light which passes the second liquid crystal layer 30 sloped by the vertical electric field has difference in phase according to the side direction of the view angle. The light seen from the front is not affected by the liquid crystal operation even if the light passes the sloped second liquid crystal layer 30. Therefore, the light maintains the polarization characteristic of the polarized condition which passed the middle polarizer 7 or the first liquid crystal layer as there is no phase delay. On the contrary, the light seen form the side direction is affected by the sloped liquid crystal as it passes the second liquid crystal layer 30 which is sloped by the vertical electric field. Thus light which has different polarization characteristic from polarized condition which passed the middle polarizer 7 or the first liquid crystal layer occurs as there is phase delay. When observing the black image displayed at the side view angle direction, light is partially phase delayed and leakage occurs when the light passes the upper polarizer 3. The narrow view angle mode in which view angle area that can display image data which has more than 10 contrast ratio is narrowed is operated due to the light leakage phenomenon.

Figure 6:
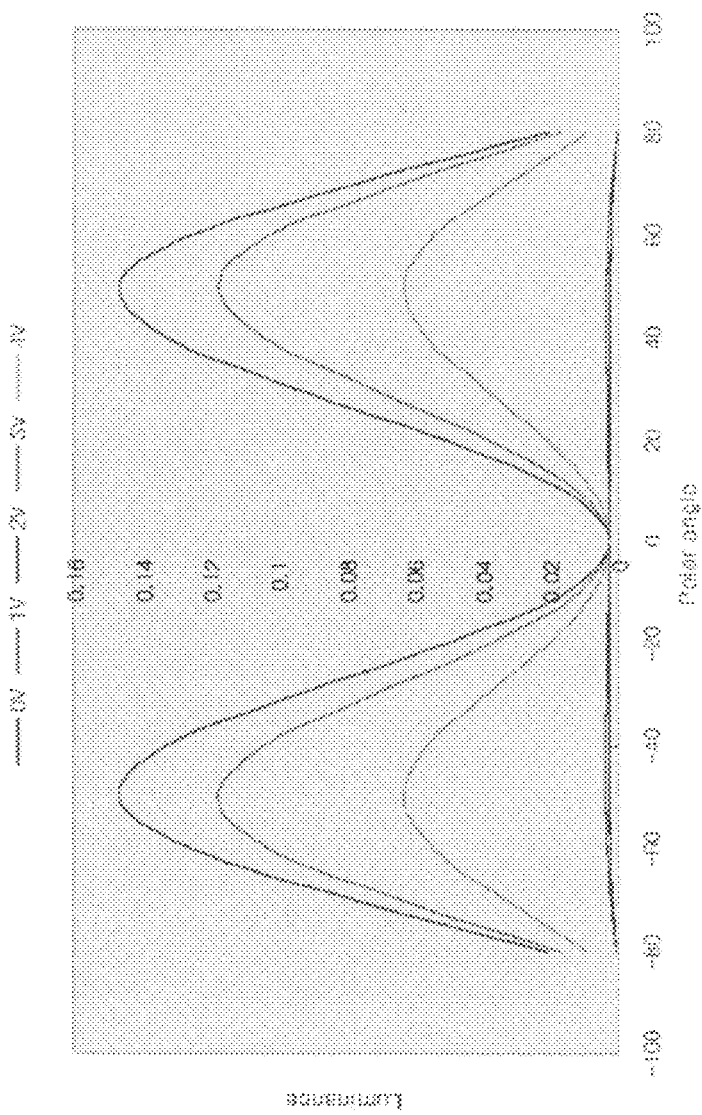
FIG. 6 illustrates view angle-brightness characteristic of the second panel part of the view angle controlling LCD according to the present invention.

The light leakage phenomenon at black image displaying condition is illustrated in FIG. 6. Referring to FIG. 6, the light does not leak from front even if the voltage is increased at the second panel part. However, the light leaks from side direction. Seen from the front, the front brightness and contrast ratios are possible to operate the narrow view angle mode as the light leaks only from the side out of the certain view angle.

Figure 7A:
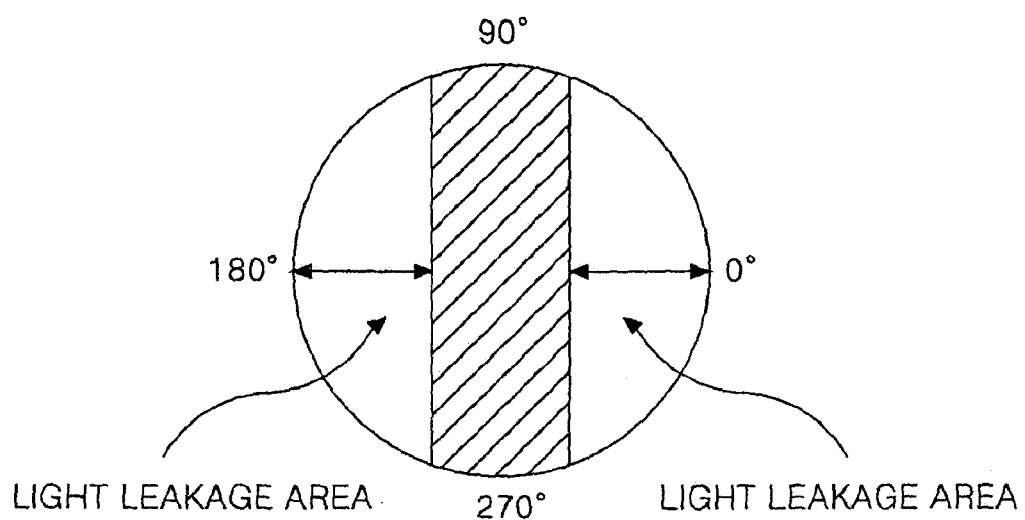
FIGS. 7A and 7B illustrate light leakage phenomenon at the second panel part of the view angle controlling LCD according to the present invention.

On the contrary, FIG. 7 illustrates light leakage at the left and right side directions seen from the plane view when the voltage is applied to the panel part of the ECB mode like in FIG. 6. If the view angle of the TN mode panel part is controlled by the ECB mode panel part which has characteristics like in FIG. 7A, only the left and right direction view angle is narrowed.

Figure 7B:
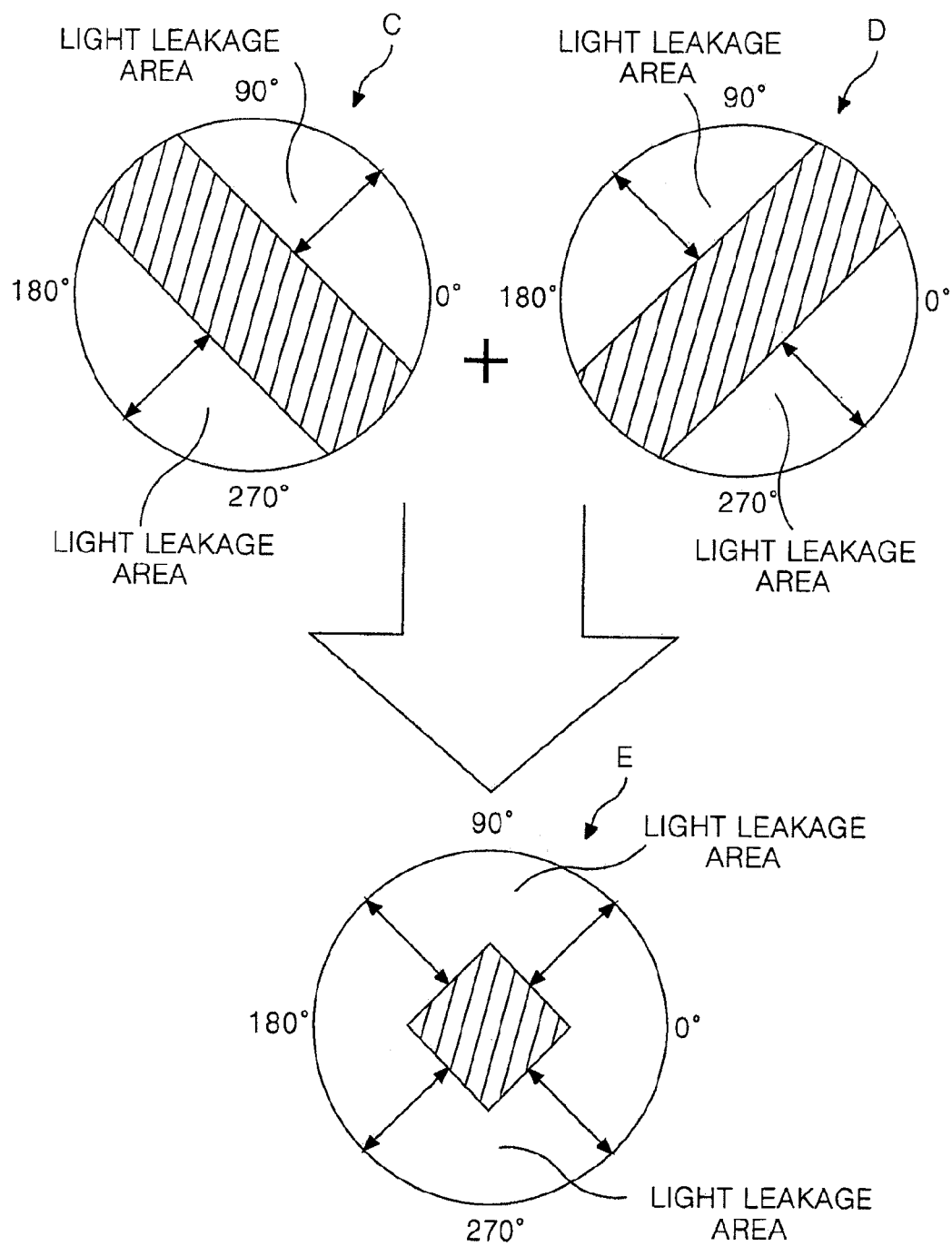
Figure 8:
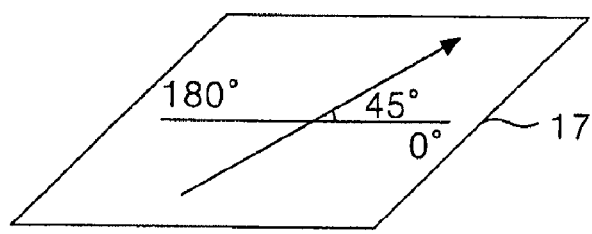
FIG. 8 illustrates alignment method of the first liquid crystal layer of the view angle controlling LCD according to the present invention.
Figure 8:
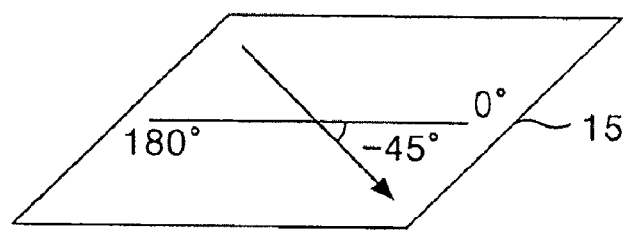

In general, the liquid crystal layer 10 of the TN mode forms the rubbing direction of the first alignment layer 15 of the TN mode as shown in FIG. 8 to be −45° on the plane polar coordinate system in order to minimize the Gray Inversion in which the brightness and darkness are reversed when the LCD is moved in upwards, downwards, left and right direction. The rubbing direction of the second alignment layer 17 of the TN mode is formed to be −45° according to the rubbing direction of the first alignment layer so that the main view angle direction is 6 o'clock direction. If the TN mode LCD used in real is applied to the present invention, the view angle can only be narrowed in one diagonal direction between C or D illustrated in FIG. 7B.

If the second liquid crystal layer is aligned in a 2-domain direction at every pixel area as shown in FIG. 7B, the light leakage area increases as illustrated in E. Thus the view angle is narrowed in up, down, left and right directions. When the second liquid crystal layer is aligned in a 2-domain direction, more effective narrow view angle mode is achieved than that of the 1-domain.

Figure 9A:
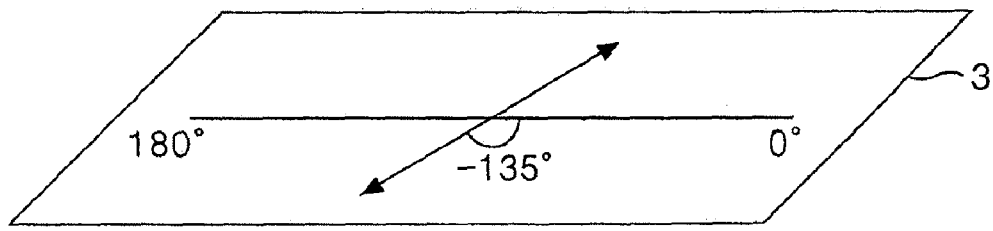
FIGS. 9A and 9B illustrate alignment method of the second liquid crystal layer of the view angle controlling LCD according to the present invention.
Figure 9A:
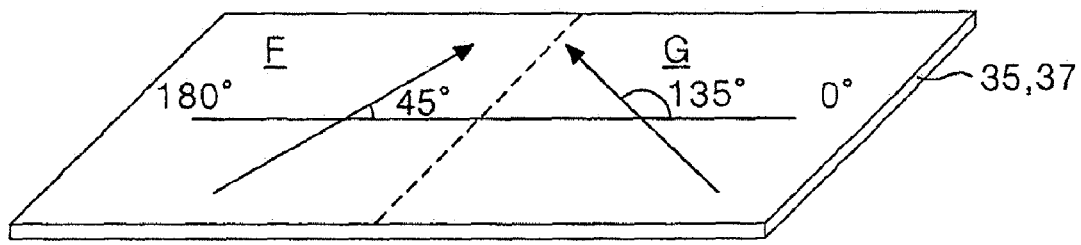
Figure 9A:
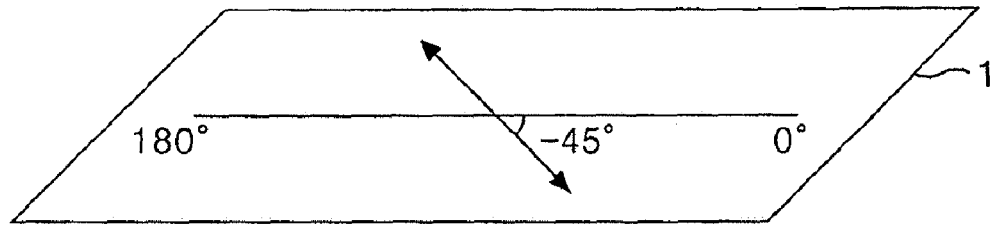
Figure 9B:
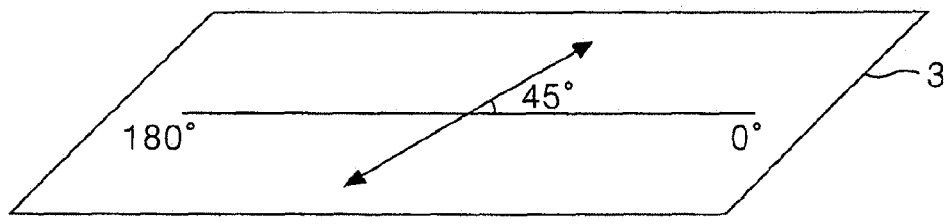
Figure 9B:
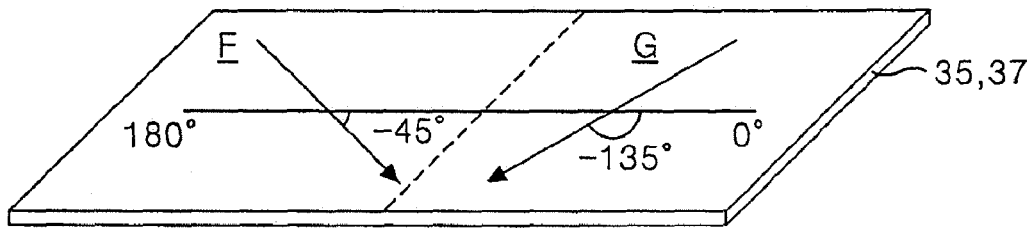
Figure 9B:
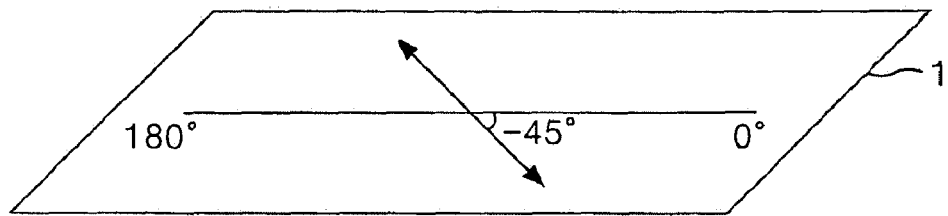

In FIGS. 9A and 9B, polarization direction of the polarizer and alignment method of the ECB mode liquid crystal will be described with the reflection of the content shown in FIGS. 7 and 8. A part of the unit pixel area is illustrated in the FIGS. 9A and 9B.

Referring to FIGS. 9A and 9B, the transmitting axis of the lower polarizer 1 is formed to be −45° (or 135°). So the transmitting axis is parallel to the aligned axis of the TN mode first liquid crystal layer of the lowest part. An incident light from a back light unit is polarized to the transmitting axis of the lower polarizer 1 and passes the first liquid crystal layer. In order to achieve the effective narrow view angle mode, the third alignment layer 35 and fourth alignment layer 37 are formed as 2-domain including a first domain area F and a second domain area G according to the unit pixel area. One domain direction is formed so that the long axis direction of the second liquid crystal layer parallel with the long axis direction of the most upper part liquid crystal molecule of the first liquid crystal layer. The other domain direction is formed so that the long axis direction of the second liquid crystal layer is vertical to the long axis direction of the most upper part liquid crystal molecule of the first liquid crystal layer. The rubbing direction of the third alignment layer 35 and the fourth alignment layer 37 is formed to be two kinds for each unit pixel to have 2-domain of above mentioned condition. One rubbing direction is formed to be 45° and the other rubbing direction is 135°. Or one rubbing direction is formed to be −45° and the other rubbing direction is −135°. The polarization direction of the upper polarizer 3 is formed to be 45° (or 135°) so that it is parallel to the long axis direction of the most upper part liquid crystal molecule of the TN mode in the first liquid crystal layer. The upper polarizer 3 only passes light in which the light axis that passed the first and second panel part is parallel with transmitting axis of the upper polarizer 3.

The rubbing direction of FIG. 8 or FIG. 9B is defined in the direction in which an observer watches the screen after completing the LCD panel.

Figure 10B:
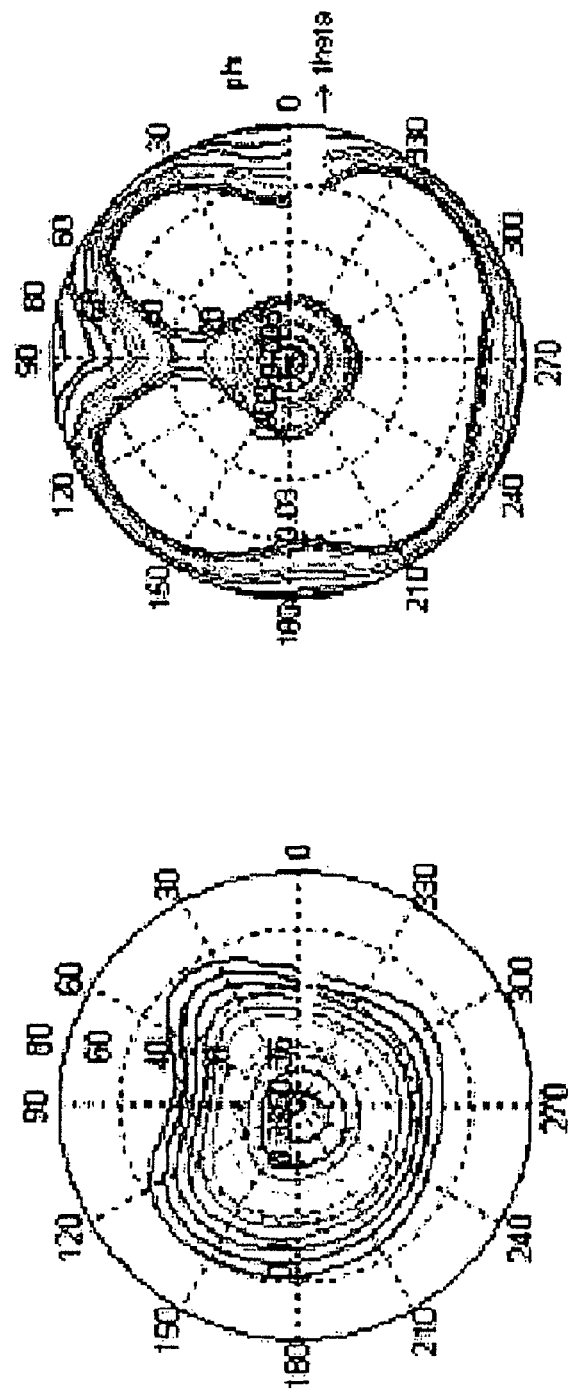
Figure 11A:
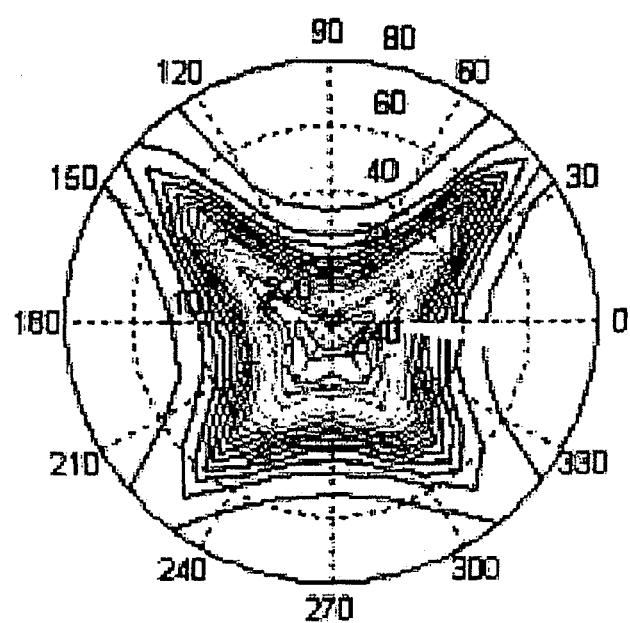
FIGS. 11A and 11B illustrate a contrast ratio according to the view angle modes of the view angle controlling LCD according to the present invention.
Figure 11B:
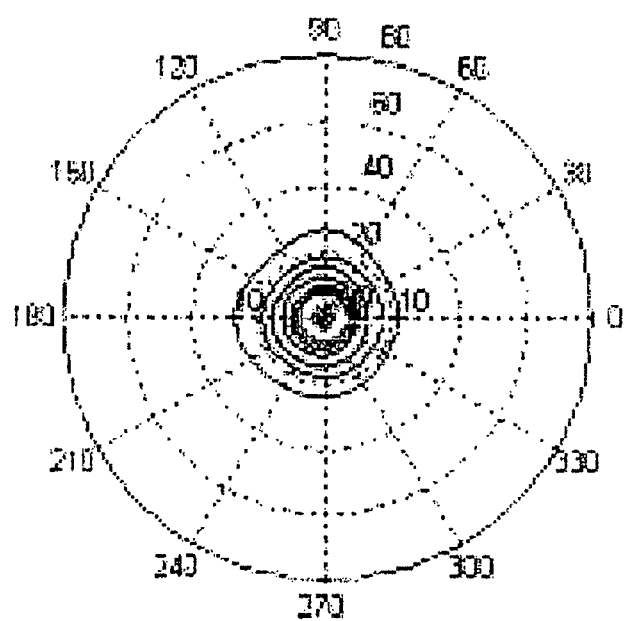

The view angle characteristic is illustrated in FIGS. 10 to 11B after simulating the conditions of FIGS. 9A and 9B. The cell gap of the second panel part is 4 µm and the driving voltage is ±2V.

The lines illustrated in FIGS. 10A to 11B mean that there is a large amount of light passing the LCD with the conditions of FIGS. 9A and 9B if the lines are red. If the lines are blue, it means that there is a small amount of light passing the LCD with the conditions of FIGS. 9A and 9B.

FIG. 10A shows the view angle-brightness characteristic of the black and white image at the wide view angle mode. Referring to the white condition of FIG. 10A, the brightness is the highest in front and it gets lower towards the top, bottom, left and right view angle directions. Referring to the black condition of FIG. 10A, the brightness is the highest in the top, bottom, left and right view angle directions and it is low in front.

FIG. 10B illustrates view angle-brightness characteristic in black and white condition of the narrow view angle mode. Referring to the white condition of FIG. 10B, the brightness is the highest from the front. Referring to the black condition of FIG. 10B, the brightness is high from the view angle area outside the front as the light leaks and the brightness is low from the front.

FIG. 11A illustrates the contrast ratio according to the view angle of the wide view angle mode through FIG. 10A. An area with clear brightness and darkness contrast is widely distributed in front, top, bottom, left and right view angle directions, wherein the area has more than 10 contrast ratio, in other words, the white and black conditions of FIG. 10A are more clear.

FIG. 11B illustrates the contrast ratio according to the narrow view angle mode through FIG. 10B. An area with clear brightness and darkness contrast is narrowly distributed in left and right view angle direction with the standard of front direction in which the viewing angle is 0°, wherein the area has more than 10 contrast ratio, in other words, the white and black conditions of FIG. 10A are more clear.

The view angle controlling LCD according to the present invention presents a view angle controlling LCD in which switching between the wide view angle mode and the narrow view angle mode is easy by using and controlling the panel part of the ECB mode. In particular, the narrow view angle mode is operated as the light passes the second liquid crystal layer which is arranged in slope to the second array substrate when the voltage is applied to the second panel part. This mode uses the light leakage effect in which the light passing the second liquid crystal layer arranged in slope to the second array substrate at the left and right view angle direction leaks. In addition, the panel part of the ECB mode is formed in 2-domain to acquire the narrow view angle mode effectively compared to the narrow view angle mode of the related art.

An OCB (Optical Controlled Birefringence) mode panel can be applied to the second panel which controls the view angle instead of the ECB mode panel. However, the OCB mode panel requires high power consumption and expensive manufacturing cost as an optical compensation film should be further comprised and a specific voltage should be applied so that the liquid crystal arrangement at the initial liquid crystal alignment stage faces each other in the middle of the liquid layer. Therefore the preferred embodiment of the present invention is to apply the ECB mode panel as the second panel part which controls the view angle.

Designing condition of the second panel part is that the tilt angle (α) of the second liquid crystal layer is 10° to 80° when the voltage is applied to the second panel part. It is difficult to acquire effective narrow view angle mode when the tilt angle of the second liquid crystal layer is lower than 10° as the light leakage effect is low. It is also difficult to acquire effective narrow view angle mode when the tilt angle of the second liquid crystal layer is above 80° for the same reason.

The condition for the tilt angle (α) range of the second liquid crystal layer to be 10° or 80° is to make the driving voltage range (ΔV) of the second panel part to be 1V<ΔV<4V. If the narrow view angle mode is driven at this driving voltage range, the phase delay range of the light transmitting the second liquid crystal layer is 15 nm~140 nm when the cell gap of the second panel part is 4 µm. Under the same voltage driving range, the phase delay range of the light transmitting the second liquid crystal layer is 14 nm~120 nm when the cell gap of the second panel part is 3.4 µm. Thus it is possible to acquire the narrow view angle mode as illustrated in FIG. 11B.

The view angle controlling LCD according to the present invention allows easy switching between the wide view angle mode and the narrow view angle mode by comprising the first panel part which decides the display condition of black and white image and the second panel part of the ECB mode which makes switching between the wide and narrow view angle modes at the upper part or the lower part of the first panel part.

In particular, the narrow view angle mode of the view angle controlling LCD according to the present invention uses the leakage effect in which the light passing the second liquid crystal layer arranged in slope leaks at the right and left side direction of the view angle due to the voltage applied to the second panel part. If the voltage applied to the second panel part is increased, the light does not leak in front. However, the light leaks at the direction in which the right and left view angle are sloped. Accordingly, it is possible to acquire the narrow view angle mode without losing the contrast ratio and front brightness.

The LCD according to the present invention ensures the wide view angle using the polarizer including the wide view angle compensation film. In addition, the LCD according to the present invention uses the ECB mode which has 2-domain alignment condition and controls the view angle of the top, bottom, right and left directions. Thus narrow view angle mode LCD is acquired compared to the related art.

The LCD according to the present invention also makes specific alignment direction of the alignment layer and polarization axis angle of the polarizer to acquire narrow view angle mode LCD compared to the related art.

Therefore, effective control of the view angle is possible as wide view angle is ensured and narrow view angle is acquired with the viewing angle controlling LCD of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A method of fabricating a view angle controlling liquid crystal display device, comprising:
    forming a first panel part that has a first group of electrodes that includes a pixel electrode and a common electrode to generate a first vertical electric field, and a first liquid crystal layer driven by the first vertical electric field; and
    forming a second panel part deposited on the first panel part that has a second group of electrodes that includes a first electrode and a second electrode to generate a second vertical electric field, and a second liquid crystal layer driven to have tilt angle from 10° to 80° by the second vertical electric field, and
    wherein the second panel part includes an ECB mode panel,
    wherein the step of forming the first panel part includes:
    forming a first substrate;
    forming a first alignment layer to cover the pixel electrode formed on the first substrate;
    forming a second substrate arranged to face the first substrate that places the first liquid crystal layer in between; and
    forming a second alignment layer to cover the common electrode formed on a lower part of the second substrate and that has 90° rubbing direction against a rubbing direction of the first alignment layer
    wherein a long axis of the second liquid crystal layer is arranged in parallel with the second substrate under inactivated condition, and
    wherein the long axis of the second liquid crystal layer is arranged to have the tilt angle under activated condition.

2. The method of fabricating a view angle controlling liquid crystal display device according to claim 1, wherein the rubbing direction of the first alignment layer is −45° and the rubbing direction of the second alignment layer is 45°.

3. The method of fabricating a view angle controlling liquid crystal display device according to claim 1, wherein the step of forming the second panel part includes:
    providing the second substrate and the first electrode formed on the second substrate;
    forming a third alignment layer that covers the first electrode;
    forming a third substrate arranged to face the second substrate that places the second liquid crystal layer in between;
    providing the second electrode formed on a lower part of the third substrate; and
    forming a fourth alignment layer that covers the second electrode.

4. The method of fabricating a view angle controlling liquid crystal display device according to claim 3, further comprising:
    forming a lower polarizer at the lower part of the first panel part to have a transmitting axis in parallel to the rubbing direction of the first alignment layer; and
    forming an upper polarizer at the upper part of the second panel part to have a transmitting axis in vertical to the transmitting axis of the lower polarizer.

5. The method of fabricating a view angle controlling liquid crystal display device according to claim 4, wherein a long axis of the second liquid crystal layer is vertical or parallel to the transmitting axis of the lower polarizer.

6. The method of fabricating a view angle controlling liquid crystal display device according to claim 4, further comprising:
    forming a middle polarizer on the upper or lower part of the second substrate to have a transmitting axis in parallel with the transmitting axis of the upper polarizer; and
    forming a wide viewing angle compensation film.

7. The method of fabricating a view angle controlling liquid crystal display device according to claim 4, wherein the third alignment layer and the forth alignment layer are formed to have at least 2 domains that include a first domain area and a second domain area per pixel unit.

8. The method of fabricating a view angle controlling liquid crystal display device according to claim 7, wherein a first rubbing direction of the first domain area and the second domain area is 45° and a second rubbing direction of the first domain area and the second domain area is 135°.

9. The method of fabricating a view angle controlling liquid crystal display device according to claim 7, wherein a first rubbing direction of the first domain area and the second domain area is −45° and a second rubbing direction of the first domain area and the second domain area is −135°.

10. The method of fabricating a view angle controlling liquid crystal display device according to claim 4, wherein the lower polarizer and the middle polarizer include a wide viewing angle compensation film.

11. The method of fabricating a view angle controlling liquid crystal display device according to claim 1, wherein a cell gap of the second panel part is formed to be 4 μm in order that a phase delay range of a light passing the second liquid crystal layer is 15 nm or 140 nm.

12. The method of fabricating a view angle controlling liquid crystal display device according to claim 1, wherein a cell gap of the second panel part is formed to be 3.4 μm in order that a phase delay range of a light passing the second liquid crystal layer is 14 nm or 120 nm.

13. The method of fabricating a view angle controlling liquid crystal display device according to claim 1, wherein the second panel part includes an OCB mode panel.

14. The method of fabricating a view angle controlling liquid crystal display device according to claim 1, wherein the first panel part includes a TN mode panel.

* * * * *